No. 870,518. PATENTED NOV. 5, 1907.
F. J. MAYWALD.
PROCESS OF PRODUCING CARBON TETRACHLORID.
APPLICATION FILED OCT. 6, 1902.
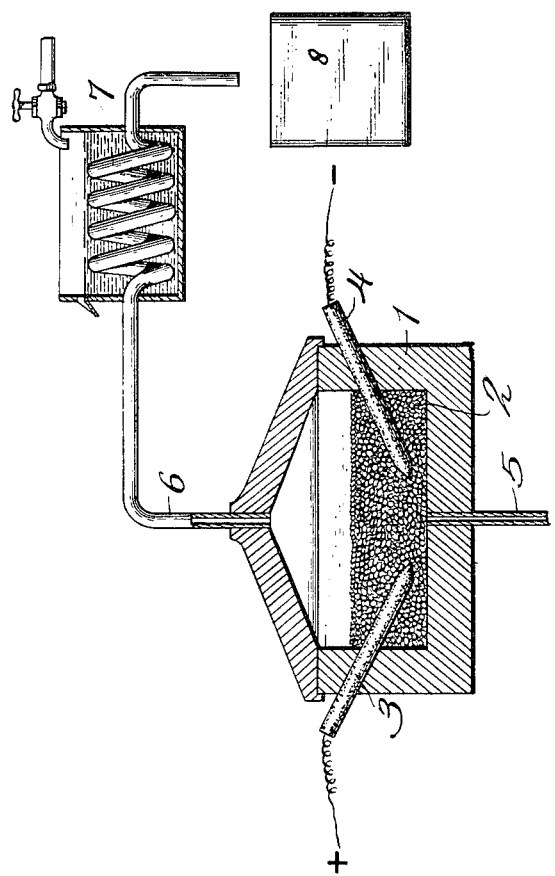

UNITED STATES PATENT OFFICE.

FREDERICK J. MAYWALD, OF NEW YORK, N. Y.

PROCESS OF PRODUCING CARBON TETRACHLORID.

No. 870,518.   Specification of Letters Patent.   Patented Nov. 5, 1907.

Application filed October 6, 1902. Serial No. 126,058.

*To all whom it may concern:*

Be it known that I, FREDERICK J. MAYWALD, a citizen of the United States, residing in the city of New York, borough of Brooklyn, and State of New York, have invented a certain new and useful Process of Producing Carbon Tetrachlorid; and I do hereby declare the following to be a full, clear, and exact description of the same, such as will enable others skilled in the art to which it appertains to make and use the same.

My invention relates to a process of producing carbon tetrachlorid ($CCl_4$), and consists in the novel manner of producing the same as hereinafter described.

In carrying out my process I directly combine chlorin gas and carbon by the aid of heat, as by passing the chlorin gas through a mass of incandescent carbon, and I preferably heat the latter to incandescence by means of an electric furnace. The electrical furnace may be of any suitable or ordinary type, and is filled with carbonaceous material such as coke, in the form of lumps or nodules, preferably about the size of a hickory nut. The carbon electrodes of the furnace are so far separated that when the current is turned on the coke nodules will be heated to incandescence. When the coke is in this condition a stream of chlorin gas, produced in any suitable or well known manner, is admitted to the furnace and caused to pass through the mass of incandescent carbon. In so doing it combines with the carbon in the proper molecular proportions to form carbon tetrachlorid, $CCl_4$. The vapors of tetrachlorid are continuously removed from the mass of incandescent carbon at the point of formation as fast as produced, collected and condensed in any suitable manner. It is my belief that in this process the electric current acts mainly as an agent for heating the carbon, though there may be some electrolytic action. However, I do not wish to be confined to heating the carbon by the electric current, but may use other methods of heating the same as well.

In the accompanying drawing I illustrate diagrammatically one form of apparatus which may be used for carrying out my process. This drawing shows an electric furnace 1 containing coke lumps or nodules 2 and provided with carbon electrodes 3 and 4. Chlorin gas is supplied to this furnace through a pipe 5 and the vapors of the carbon tetrachlorid issue from the furnace through a pipe 6 and pass into a condenser 7 wherein they are condensed, after which they are collected in a vessel 8. Any excess of chlorin admixed with the vapors of tetrachlorid is separated when the latter is condensed, and may be re-used.

It is obvious that the process as above described is capable of being modified in various ways without departing from the essential features thereof, and I do not limit myself to the precise details above described, or to the use of any particular apparatus in carrying it out.

What I claim is:—

1. The process of forming a chlorid of carbon which consists in contacting incandescent carbon with a stream of chlorin, removing the products of reaction from the point of formation as fast as formed and condensing the same.

2. The process of making carbon tetrachlorid which consists in continuously passing a stream of chlorin gas past and in contact with a mass of incandescent carbon, continuously removing the carbon tetrachlorid formed and condensing the same.

3. The process of making carbon tetrachlorid which consists in continuously passing a stream of chlorin gas past and in contact with a mass of carbon kept at incandescent temperature by an electric current, continuously removing the carbon tetrachlorid formed and condensing the same.

4. The process of making carbon tetrachlorid which consists in continuously passing a stream of chlorin gas into contact with incandescent coke, continuously removing the carbon tetrachlorid formed and condensing the same.

5. The process of making carbon tetrachlorid which consists in continuously passing a stream of chlorin gas into contact with incandescent coke having an electric current traversing the same, continuously removing the carbon tetrachlorid formed and condensing the same.

6. The process of forming a chlorid of carbon which consists in contacting incandescent carbonaceous material with a stream of chlorin, removing the products of reaction from the point of formation, and condensing the same.

7. The process of forming a chlorid of carbon which consists in contacting incandescent carbonaceous material with a stream of chlorin gas under regulated pressure, removing the products of reaction from the point of formation and condensing the same.

In testimony whereof I affix my signature, in the presence of two witnesses.

FREDERICK J. MAYWALD.

Witnesses:
 H. M. MARBLE,
 D. HOWARD HAYWOOD.